United States Patent
Palmer et al.

(10) Patent No.: US 6,608,005 B2
(45) Date of Patent: Aug. 19, 2003

(54) WELLBORE FLUIDS AND THEIR APPLICATION

(75) Inventors: Bentley J. Palmer, Phoenix, AZ (US); Diankui Fu, Missouri City, TX (US); Roger Card, Paris (FR); Edgar Volpert, Munchen (DE)

(73) Assignee: Schlumberger Technology Corporation, Sugar Land, TX (US)

( * ) Notice: Subject to any disclaimer, the term of this patent is extended or adjusted under 35 U.S.C. 154(b) by 34 days.

(21) Appl. No.: 09/829,268

(22) Filed: Apr. 9, 2001

(65) Prior Publication Data

US 2002/0019317 A1 Feb. 14, 2002

Related U.S. Application Data

(60) Provisional application No. 60/195,982, filed on Apr. 7, 2000.

(51) Int. Cl.[7] .................................................. C09K 3/00
(52) U.S. Cl. ................... 507/103; 507/129; 507/130; 507/240; 507/242; 507/203; 507/136; 507/261; 507/925; 175/50
(58) Field of Search ............................ 507/129, 130, 507/240, 242, 103, 203, 925, 136, 261; 175/50

(56) References Cited

U.S. PATENT DOCUMENTS

| | | | |
|---|---|---|---|
| 2,542,020 A | 2/1951 | Fischer | 252/8.5 |
| 2,552,775 A | 5/1951 | Fischer | 252/8.5 |
| 2,573,961 A | 11/1951 | Fischer | 252/8.5 |
| 2,696,468 A | 12/1954 | Fischer | 252/8.5 |
| 2,739,120 A | 3/1956 | Fischer | 252/8.5 |
| 4,012,329 A | 3/1977 | Hayes et al. | 252/8.5 P |
| 4,624,754 A | 11/1986 | McManis, III et al. | 204/58.5 |
| 5,552,241 A | 9/1996 | Mamantov et al. | 429/103 |
| 5,731,101 A | 3/1998 | Sherif et al. | 429/102 |
| 5,827,602 A | 10/1998 | Koch et al. | 429/194 |
| 6,350,721 B1 * | 2/2002 | Fu | 507/242 |
| 2002/0055439 A1 * | 5/2002 | Palmer et al. | 507/200 |

FOREIGN PATENT DOCUMENTS

WO     WO 99/14286     3/1999     ............ C09K/7/06

OTHER PUBLICATIONS

Room–Temperature Molten Salts, 5 Adv. Molten Salt Chem. 185,188, by Hussey (1983).
Room–Temperature Molten Salts: Neoteric "Green" Solvents for Chemical Reactions and Processes. Jairton Jupont, Crestina S. Consorti, and John Spencer, (2000).
Hydrophobic, Highly conductive Ambient–Temperature Molten Salts. Pierre Bonhote, et al., (1996).
The phase behaviour of 1–alkyl–3–methylimidazolium tetrafluoroborates; ionic liquids and ionic liquid crystals. John D. Holbrey and Kenneth R. Seddon., (1999).

* cited by examiner

Primary Examiner—Philip Tucker
(74) Attorney, Agent, or Firm—Thomas O. Mitchell; Catherine Menes; Brigitte Jeffery

(57) ABSTRACT

Non-aqueous base wellbore fluids characterized by enhanced electrical conductivity due to formulation with specified ionic liquids are disclosed. Drilling, completion, and workover methods utilizing the wellbore fluids are also disclosed.

33 Claims, 3 Drawing Sheets

WELLBORE FLUIDS AND THEIR APPLICATION

REFERENCE TO RELATED PROVISIONAL APPLICATION

This application claims the benefit under 35 U.S.C. 119(e) of U.S. Provisional application No. 60/195,982 filed Apr. 7, 2000, and entitled "Novel Fluids and Use in Oilfield Applications."

TECHNICAL FIELD OF THE INVENTION

The invention relates to electrically conductive fluids and to their use. In particular, the invention relates to electrically conductive non-aqueous fluids and their use in oilfield operations, especially in development of or maintenance of a source of oil and/or gas.

BACKGROUND OF THE INVENTION

In the process of rotary drilling a subterranean well, such as a hydrocarbon well, a drilling fluid (liquid) or "mud" is circulated down drill pipe or coiled tubing, through the bit, and up the annular space between the drill pipe or coiled tubing and the formation, to the surface. The drilling fluid performs a multiplicity of different functions, including cooling and lubrication of the drill pipe or coiled tubing and drill bit, removal of cuttings from the bottom of the wellbore to the surface, and, often, transmission of drilling or formation information from downhole to the surface by electrical telemetry.

The functions required can be achieved by a wide variety of drilling fluids which are formulated with and contain various combination of liquids, solids, and gases. In general, drilling fluids are classified according to the constitution of the continuous or external phase, i.e., as an aqueous— (water) base or based drilling fluid, or as a non-aqueous— (organic liquid) base or based drilling fluid, the latter often simply referred to in oilfield operations as an oil-based fluid.

Aqueous-base (water-base) fluids constitute the most commonly used drilling fluid type. The aqueous phase may be formed of fresh water, or, more commonly, of a brine. As a discontinuous or disperse phase, water-base fluids may contain gases or water-immiscible fluids, such as diesel oil, in the form of an oil-in-water emulsion, and solids including weighting materials, such as barite. Water-base fluids also typically contain clay minerals, polymers, and surfactants for achieving desired properties or functions.

However, in drilling water-sensitive zones, such as reactive shales, or where bottom hole temperature conditions are severe, or where corrosion is a significant problem, non-aqueous base drilling fluids are preferred. This preference exists notwithstanding that, as will be recognized by those skilled in the art, water or moisture is almost always present in a wellbore, and many "non-aqueous" drilling fluids contain water or brine as a discontinuous phase in the form of a water-in-oil emulsion (or invert emulsion). Solid additives in non-aqueous-base drilling fluids are analogous to those of water-base fluids, with consideration given to solubility, and non-aqueous base fluids also contain additives for the control of density, rheology and fluid loss. If an invert emulsion is present, it may be formed by and stabilized with the aid of one or more specially selected emulsifiers.

Although non-aqueous-base drilling fluids are more expensive than water-base muds, their operational advantage and superior technical performance warrant their use in the particular situations mentioned. Unfortunately, many prior art non-aqueous-base drilling fluids are characterized by low electrical conductivity, i.e., high resistivity. This low electrical conductivity is a technical disadvantage for important wellbore fluid functions, e.g., in transmission of information from downhole to the surface by electrical telemetry, particularly in directional drilling, and in electrical well-logging and imaging operations performed during the drilling operation to determine, inter alia, the type of formation and the material in the formation. In the latter mentioned operations, some logging tools work on the basis of a resistivity contrast between the fluid in the wellbore and that in the formation. In the operation of such resistivity focused logging tools, alternating current flows from the tools through the formation between two electrodes. Accordingly, the fluids in the path of the electric current are the wellbore fluid, the wellbore fluid which has penetrated the formation medium (such as formation rock) under differential pressure, and the formation fluids. As will readily be appreciated by those skilled in the art, low electrical conductivity or high resistivity by the wellbore fluid affects logging and imaging results, and analysis of the logging and imaging results may require substantial compensation in calculating formation resistivity.

Accordingly, the use of resistivity logging tools has been limited primarily to instances where a water-based drilling fluid is used for the drilling operation because of the very low electrical conductivity of the non-aqueous base fluids. Even in the case where electrically conductive brine is dispersed in an oil phase, the discontinuous character of the brine droplets in the oil phase prevents or inhibits the flow of electricity. Indeed, the inability of such emulsions to conduct electricity (until a very high potential difference is applied) is used as a standard test of emulsion stability.

Attempts to make oil-based drilling fluids electrically conductive for the purpose of electrical logging have been made. U.S. Pat. No. 2,542,020; U.S. Pat. No. 2,552,775; U.S. Pat. No. 2,573,961; U.S. Pat. No. 2,696,468; and U.S. Pat. No. 2,739,120, all to Fischer, disclose soap-stabilized oil-based fluids comprising an alkaline-earth metal base dissolved in up to 10% by weight water. The patentee claims reduction of the electrical resistivity to below 500 ohm-m, which corresponds to an increase of conductivity to $\kappa > 2000$ $\mu S\ m^{-1}$. Again, U.S. Pat. No. 4,012,329 discloses an oil-external micro-emulsion made with sodium petroleum sulfonate and a reported resistivity<1 ohm-m ($\kappa > 1\ S\ m^{-1}$).

Difficulties in relation to the resistivity of non-aqueous-base fluids in oilfield operations or development or maintenance of a well are not confined to drilling operations. Logging, imaging, etc., may also be conducted during "completion" of the well, i.e., when the well is being prepared for development or production, using wellbore fluids referred to as "completion" fluids, or later, e.g., in a well "workover", using wellbore fluids referred to as "workover" fluids. The completion fluid is provided or circulated in the wellbore while such operations as perforation or sand exclusion are conducted. In maintenance or renewal (redevelopment) of a well, a "workover" may be conducted to restore or improve production. This operation will similarly involve provision of or circulation of a specially formulated workover fluid in the wellbore, and may involve logging in the wellbore. As will be evident, the conductivity of these wellbore fluids is also important, and the high resistivity of non-aqueous base fluids restricts their utilization in these situations. Accordingly, non-aqueous base or based wellbore fluids (e.g., drilling, completion, and workover fluids) having increased or enhanced conductivity, as well as methods for their use, might have great commercial value. The invention is directed to the provision of such fluids and methods.

SUMMARY OF THE INVENTION

Accordingly, in one embodiment, the invention relates to a non-aqueous base wellbore fluid of increased conductivity containing an effective concentration of cations and anions from a water stable hydrophobic ionic liquid. More particularly, the invention relates to such non-aqueous base wellbore fluid comprising a non-aqueous base liquid containing an effective concentration of cations and anions from a water stable hydrophobic ionic liquid. The wellbore fluid of this embodiment of the invention thus comprises a fluid formed by blending a non-aqueous base liquid with an effective amount of a water stable hydrophobic ionic liquid. As understood herein, an "effective concentration" of the cations and anions is that concentration sufficient to raise the conductivity of the wellbore fluid to the desired level or degree. Similarly, an "effective amount" of ionic liquid will be that amount of the ionic liquid necessary or required, when blending with the high resistivity organic liquid, to provide the concentrations of cations and anions required in the formulated fluid, i.e., in an "effective concentration". Finally, the expression "ionic liquid", defined more fully hereinafter, is understood to include mixtures of such substances.

In a second, preferred embodiment, the invention relates to a non-aqueous base wellbore fluid of increased conductivity comprising a single phase mixture of a non-aqueous base liquid and a minor amount of a second, different organic solvent liquid, or mixture thereof, soluble in the non-aqueous base liquid, containing an effective concentration of cations and anions from a water stable hydrophobic ionic liquid. The non-aqueous base wellbore fluid of this second embodiment of the invention is formed by blending a non-aqueous base liquid with a minor amount of a second, different organic solvent liquid, or mixture thereof, which is soluble in the non-aqueous base liquid, containing cations and anions in effective amount from a water stable hydrophobic ionic liquid.

The invention further comprises the utilization of the non-aqueous base wellbore fluids described in particular wellbore operations. In particular, the invention includes methods of drilling a well, of completing a well, and of well workover, as described previously, each of which is characterized by utilization of the non-aqueous base fluids as described herein.

The common denominator of each embodiment of the invention is that each involves the employment or use of one or more of a class of compounds generally referred to as "ionic liquids". As understood herein, an "ionic liquid" is a compound which is a liquid at ambient temperatures and which consists entirely of a cation and an anion or a substance which is a liquid at ambient temperatures and which consists entirely of cations and anions. Accordingly, an "ionic liquid" is to be distinguished from a (1) "molecular liquid" (e.g., carbon tetrachloride), and (2) a "solution" which contain dissolved electrolyte (e.g., $Na^+Cl^-$ in water). In the case of a quantity of an ionic liquid, the entire liquid is composed of cations and anions, i.e., it is a homogeneous liquid having those two components (hence also the expression "molten salts"). Thus, pure water would not qualify as an ionic liquid since it consists almost wholly of $H_2O$ molecules, rather than ions. Nor would $Na^+Cl^-$ solution qualify as an ionic liquid, since it is composed of $H_2O$ molecules and $Na^+$ and $Cl^-$ ions.

DETAILED DESCRIPTION OF THE INVENTION

Figure 1:
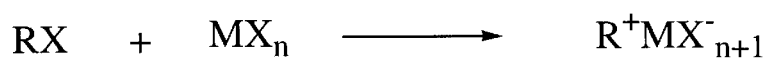
FIG. 1 illustrates a general reaction schematic (above) showing the preparation of ionic liquid which may be used in the invention, and (below) the exemplary reaction of 1-ethyl-3-methylimidazolium chloride with silver nitrate to form 1-ethyl-3-methylimidazolium nitrate.
Figure 1:
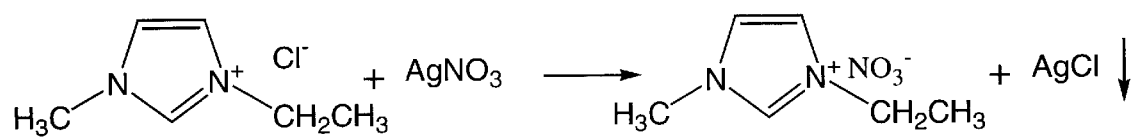

As indicated, the non-aqueous base wellbore fluids of the first embodiment of the invention will comprise a suitable non-aqueous base liquid, as known or used in the art, or non-aqueous organic liquid(s) analogous thereto, containing an effective concentration of the cations and anions from a water stable ionic liquid. The expression "non-aqueous base liquid" is understood to include a mixture of such liquids, and commonly, such non-aqueous base liquid will comprise a high resistivity organic liquid or liquids. As employed hereinafter, the expression "high resistivity organic liquid" refers to an organic liquid, including mixtures thereof, suitable as a continuous phase for wellbore applications and exhibiting low electrical conductivity by standard conductivity measurement. Typically, such organic liquids exhibit electrical conductivity in the range $1.0 \times 10^{-6}$ to $1.0 \times 10^{-2}$ $\mu S$ $m^{-1}$ at a frequency of 1 kHz. Suitable high resistivity organic liquids for non-aqueous base well-bore fluid applications are known, or may be selected by those skilled in the art, and include, but are not limited to, oil; hydrocarbon refined fractions from oil, such as diesel fuel or mineral oil; hydrocarbon liquids, other than oil or refined hydrocarbon fractions from oil, such as n-paraffins, alpha-olefins, internal olefins, and poly-alpha-olefins; liquids such as dialkyl ethers, alkyl alkanoate esters, and acetals; and natural oils, such as triglycerides, including rape-seed oil, sunflower oil and mixtures thereof. Low toxicity and highly biodegradable oils will be preferred, especially for offshore drilling.

In the case of the second embodiment of the invention, the second, different organic solvent liquid will be selected from a different non-aqueous base liquid, as de-scribed, or a polar organic liquid, or mixture thereof; or mixture thereof; soluble in the primary non-aqueous base liquid. In a most preferred aspect, the invention comprises a wellbore fluid (and method for its use) comprising a single phase mixture of a first high resistivity organic liquid and a minor amount of a second, different high resistivity organic liquid, or polar organic liquid(s), or mixture thereof; or mixture thereof; soluble in the first high resistivity organic liquid, containing an effective concentration of cations and anions from a water stable hydrophobic ionic liquid. The non-aqueous base wellbore fluid of this preferred aspect of the invention is formed by blending a first high resistivity organic liquid with a minor amount of a second, different high resistivity organic liquid, or a polar organic liquid, or mixture thereof; or mixture thereof; soluble in the first high resistivity organic liquid, containing cations and anions in effective amount from a water stable hydrophobic ionic liquid.

As mentioned, the water stable hydrophobic ionic liquid will be supplied or blended in an amount effective to provide sufficient cations and anions therefrom to give a concentration thereof which will raise or increase the conductivity of the wellbore fluid of the invention to the desired degree. While not intended as a limitation herein, an electrical conductivity for the wellbore fluid of not less than $10\,\mu S.m^{-1}$ and preferably of no less than $10^3\,\mu S.m^{-1}$ is considered desirable for electrical logging operations. The precise degree of conductivity required will depend on the circumstances and operations involved. Accordingly, those skilled in the art may adjust the amount of the ionic liquid blended to achieve the conductivity level mentioned or other suitable level.

It must be noted in this regard that many ionic liquids exhibit limited solubility in organic liquids. For example, 1-ethyl-3-methylimidazolium tetrachloroaluminate forms two phases with diesel at room temperature, although fully mixable at about 66° C. In the selection of an ionic liquid for the first embodiment of the invention, therefore, an important requirement is that the ionic liquid chosen exhibit sufficient solubility in the non-aqueous base liquid or high resistivity organic liquid, i.e., a sufficient amount or concentration, to provide an effective concentration of cations and anions in the liquid. Determination of a suitable ionic liquid may be carried out by testing of the ionic liquid by dissolving the ionic liquid in the non-aqueous base liquid or high resistivity organic liquid, and measurement of the conductivity of the blend or mixture formed. With conductivity requirements and solubility limitations in mind, an amount of ionic liquid supplied to the base liquid might range up to about 10 percent or so, perhaps in a range of from about 0.5 percent to about 5 percent or more, by volume.

In the preparation of wellbore fluids of the second embodiment, sufficient solubility is required in at least one of the second, different organic solvent liquid or high resistivity organic liquid or polar liquid; or mixtures thereof; and significant solubility in the primary non-aqueous base liquid or high resistivity organic liquid is not required. In addition, as indicated, the second, different liquid may comprise one or more mutually soluble liquids, so that, for example, the ionic liquid might be blended with one (high resistivity or polar) of the secondary liquids, followed by blending or combination of this mixture with another organic liquid, high resistivity or non polar, and blending of the resulting combination with the primary non-aqueous base liquid or high resistivity organic liquid.

In the second embodiment of the invention, the second, different organic solvent liquid will be selected principally for its own solubility in the primary non-aqueous base liquid and its ability to dissolve a sufficient amount of the ionic liquid to ensure that an effective concentration of cations and anions from the water stable and hydrophobic ionic liquid are provided in the primary liquid. While, if used, the polar organic liquid itself may enhance conductivity of the high resistivity organic liquid, its function in this embodiment is primarily to achieve sufficient dissolution of the ionic liquid selected. Accordingly, the second, different organic solvent liquid, such as a different high resistivity organic liquid or polar organic liquid, will preferably be employed in a minor amount, e.g., 40 or 30 percent or less, preferably 20 percent or less, by volume of the primary non-aqueous base liquid or high resistivity organic liquid. Exemplary polar organic liquids include, but are not limited to, alcohols, glycols, polyalkylene glycols, mono (alkyl or aryl) ethers of glycols, mono (alkyl or aryl) ethers of polyalkylene glycols, monoalkanoate esters of glycols, monoalkanoate esters of polyalkylene glycols, ketones, diketones and polyketones, nitriles, dialkyl ethers of polyalkylene glycols, dialkanoate esters of polyalkylene glycols, cyclic polyethers, N-(alkyl or cycloalkyl)-2-pyrrolidones, N-alkyl piperidones, N,N-dialkyl alkanoamides, N,N,N',N'-tetra alkyl ureas, dialkylsulphoxides, pyridine and alkylpyridines, hexaalkylphosphoric triamides, 1,3-dimethyl-2-imidazolidinone, nitroalkanes, nitro-compounds of aromatic hydrocarbons, sulfolane, butyrolactone, and propylene carbonate.

Hydrophobic ionic liquids employed in the invention having both large cations and large anions may have reduced ionic conductivity. However, the presence of a polar organic liquid as a cosolvent may enhance the ionic conductivity by lowering the solution viscosity. Suitable cosolvents may be selected from the group consisting of linear ethers, cyclic ethers, esters, carbonates, lactones, nitrites, amides, sulfones and sulfolanes. The polar organic liquid may also be selected from the group consisting of diethylether, dimethoxyethane, tetrahydrofuran, dioxane, dioxolane, methyltetrahydrofuran, methyl formate, ethyl formate, methyl propionate, ethylene carbonate, dimethyl carbonate, diethyl carbonate, ethylmethyl carbonate, dibutyl carbonate, butyrolactones, acetonitrile, benzonitrile, nitromethane, nitrobenzene, dimethylformamide, N-methylpyrrolidone, dimethylsulfone, tetramethylene sulfone, and thiophene.

As indicated previously, as understood herein, the expression "ionic liquid" refers to a compound having the following characteristics:

liquid at "ambient temperatures"; and consisting solely of a cation and an anion.

Further, the expression "ambient temperatures" refers to temperature ranges that are likely to be encountered in the environment in which the ionic liquid containing or comprising fluids of the invention will be formulated or used. Hence, for utilization in wintry Alaska, the ambient or surrounding temperature may be, e.g., -50° C. An ionic liquid used in the wellbore fluids of the invention, if employed in formulation in such an environment, must be liquid at that temperature, and must not separate from the continuous phase. Accordingly, the term "ionic liquid" is defined functionally, but the description herein is provided here to enable those skilled in the art to select and design a proper fluid and regime using an appropriate ionic liquid-including fluid.

In addition, as mentioned, ionic liquid selected for the non-aqueous base fluids of the invention must be water stable, i.e., must not deteriorate in the presence of or react substantially with water, and must be hydrophobic. These characteristics are known in the case of some ionic compounds, and may be determined for others by simple experimentation. For example, U.S. Pat. No. 5,827,602 describes water stable and hydrophobic ionic liquids, as well as ionic liquids that are not water stable.

Because ionic liquids are known compounds, they and their preparation, per se, form no part of the present invention. The preparation of ionic liquids is well within the ambit of those skilled in the art, and some may be obtained commercially. A generic equation for their preparation is shown in FIG. 1, as well as the reaction for preparation of a specific single ionic liquid.

Many ionic liquids, useful in the practice of the invention, are the salts of or reaction products between nitrogen-containing compounds (providing the cations), such as heterocyclic nitrogen-containing compounds or amines and a Lewis acid or non-Lewis acid (providing anions). Preferably, the nitrogen-containing compound is selected to provide the cation R from compounds having cations having the formulas Pyridinium

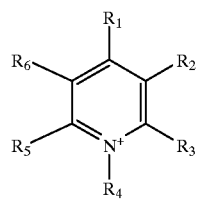

Pyridazinium

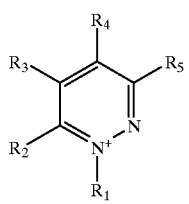

Thiazolium

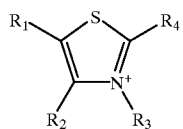

Oxazolium

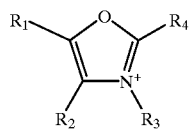

Pyrimidinium

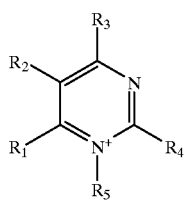

Pyrazinium

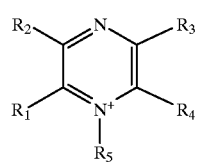

Triazolium

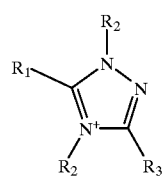

Imidazolium

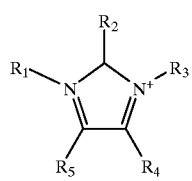

Pyrazolium

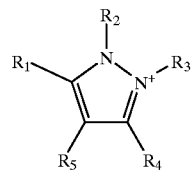

wherein $R_1$, $R_2$, $R_3$, $R_4$, $R_5$, and $R_6$ are selected from H, F, and saturated and unsaturated hydrocarbon containing from 1 to 22 carbons, respectively, with the provision that the total number of carbon atoms contained by $R_1$, $R_2$, $R_3$, $R_4$, $R_5$, and $R_6$ (or $R_1$–$R_5$, or $R_1$–$R_4$) does not exceed 24; preferably, $R_1$, $R_2$, $R_3$, $R_4$, $R_5$, and $R_6$ being selected, respectively, from H and alkyl containing from 1 through 12 carbon atoms, with the same limitation of number of carbon atoms for $R_1$ to $R_6$ (or $R_1$–$R_5$, or $R_1$–$R_4$); and most preferably, H and alkyl containing 1 through 4 carbon atoms, respectively; and from compounds having cations having the formula

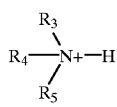

wherein $R_3$, $R_4$, and $R_5$ are selected from H, and saturated and unsaturated hydrocarbon containing from 1 to 22 carbons, respectively, provided that $R_3$, $R_4$, and $R_5$ are not simultaneously H, and with the further provision that the total number of carbon atoms contained by $R_3$, $R_4$, and $R_5$, does not exceed 24; preferably, $R_3$, $R_4$, and $R_5$, being selected from H and alkyl containing from 1 through 12 carbon atoms, respectively, with the same limitation of carbon atoms and provision regarding H; and most preferably, being selected from H and alkyl containing 1 through 4 carbon atoms, respectively, provided that $R_3$, $R_4$, and $R_5$ are not simultaneously H.

Particularly preferred ionic liquids are those in which the cation is N-alkylpyridinium or 1,3-dialkyl-imidazolium, with very preferred species being N-butyl-pyridinium and 1-ethyl-3-methylimidazolium. These two species have the formulas

Also particularly preferred are ionic liquids in which the formula

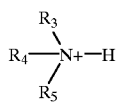

wherein $R_3$, $R_4$, and $R_5$ are the same or different and are selected from the group consisting of H, methyl, and ethyl, provided that $R_3$, $R_4$, and $R_5$ are not simultaneously H.

As indicated, the anions of the ionic liquids may vary widely, being selected from various Lewis acids and non-Lewis acids. The following anions are preferred constituents of ionic liquids comprising fluids of the invention: $BF_4^-$; $PF_6^-$; $SbF_6^-$; $CF_3SO_3^-$; $CuCl_2^-$; $Cu_2Cl_3^-$; $Cu_3Cl_4^-$; $NO_3^-$; $(CF_3SO_2)_2N^-$; $Br^-$; $ClO_4^-$; $CH_3COO^-$; and $BPh_4^-$. $BF_4^-$ and $PF_6^-$ are preferred anions for ionic liquids for which water stability is desired. Again, certain quaternary ammonium salts, in which the quaternary ammonium ion is large, i.e., wherein the total number of carbon atoms is greater than 20, are ionic liquids, and may be used.

Preparation of ionic liquids and disclosures of additional ionic liquid species which may be used in fluids of the invention are contained in Room-Temperature Molten Salts, 5 Adv. Molten Salt Chem. 185, 188, by Hussey (1983); U.S. Pat. No. 5,827,602, Hydrophobic Ionic Liquids, assigned to Covalent Associates Incorporated, 1998 (e.g., col. 6, Examples 1–3); U.S. Pat. No. 5,731,101, Low Temperature Ionic Liquids, assigned to Akzo Nobel N. V., 1998 (e.g., col. 3, Examples 1 and 2); U.S. Pat. No. 5,552,241, Low Temperature Molten Salt Compositions Containing Fluoropyrazolium Salts, assigned to Electrochemical Systems, Inc., 1996 (e.g., col. 9, Example 1); and U.S. Pat. No. 4,624,754, Ionic Liquid Compositions for Electrodeposition, G. McManis et al., inventors (unassigned), 1986 (e.g., col. 3, l. 21). Each of these United States patents is hereby incorporated by reference in its entirety, and in particular those portions indicated following each reference.

As indicated, the wellbore fluids of the invention may be prepared by blending of the components, i.e., the non-aqueous base liquid or the high resistivity organic liquid and an effective amount of the water stable and hydrophobic ionic liquid, or the non-aqueous base liquid or high resistivity organic liquid and the second, different organic solvent or high resistivity organic liquid or polar organic liquid containing the effective amount of the cations and anions of the ionic liquid selected. Blending may be accomplished prior to wellbore entry or as the fluid is being circulated downhole. In some cases, the water stable hydrophobic ionic liquid may be formed from precursors thereof, for example, in a non-aqueous base liquid or polar organic liquid to be used, if the combination is carefully controlled to account for any excess heat generated and for byproducts formed. Drilling, completion, and workover operations, using the novel wellbore fluids of the invention, may be conducted in the normal manner.

Figure 2:
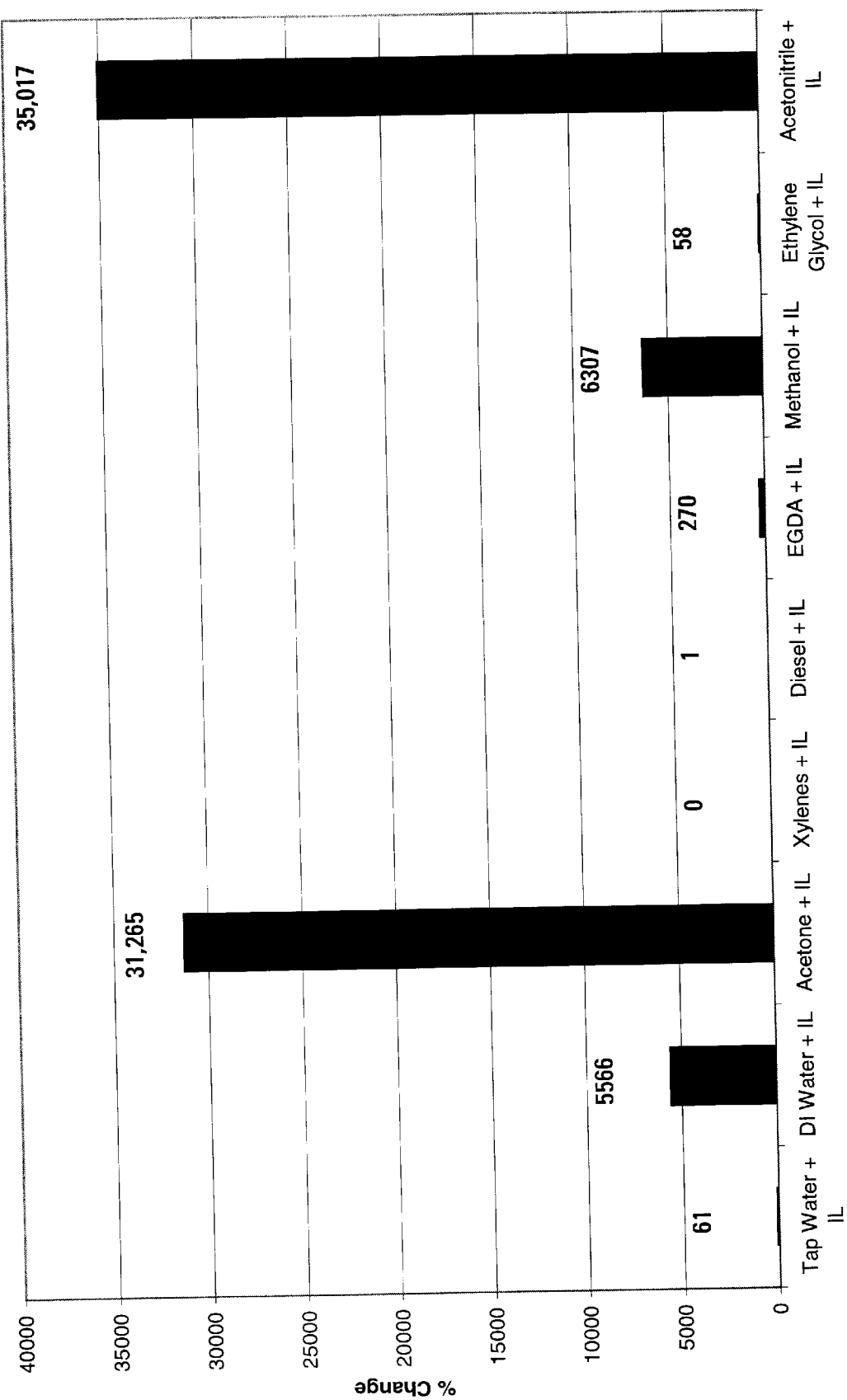
FIG. 2 illustrates percent increase in conductivity of various base fluids after the addition of a small amount of a particular water stable and hydrophobic ionic liquid.

In order to demonstrate the effect on conductivity of an ionic fluid on various liquids, the following tests were conducted. Beakers containing samples (25–30 ml) respectively of tap water, de-ionized water, acetone, a commercial mixture of xylenes, diesel, ethylene glycol diacetate, methanol, ethylene glycol, and acetonitrile were prepared. A water stable and hydrophobic ionic liquid, 1-ethyl-3-methylimidazolium hexafluorophosphate, was added to each beaker in amount sufficient to bring the concentration in each beaker to 0.005M of the ionic liquid. The conductivity of the liquid in each beaker was then measured. The results of the measurements are indicated in FIG. 2 of the drawing.

Figure 3:
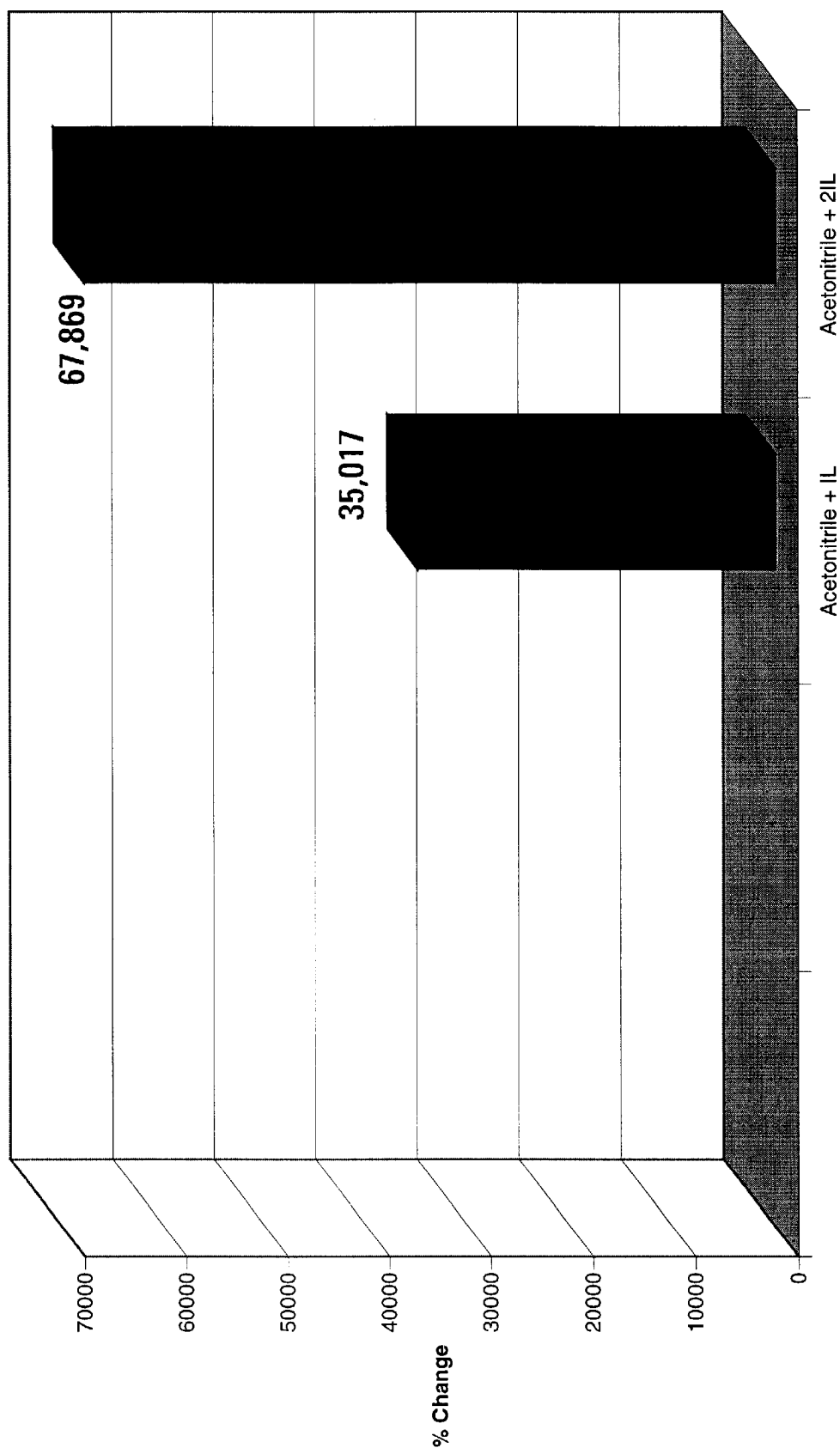
FIG. 3 compares the increase in conductivity of acetonitrile after the addition of a particular water stable hydrophobic ionic liquid thereto at a first concentration and then at a concentration twice the first concentration.

In particular, after addition of the 1-ethyl-3-methylimidazolium hexafluorophosphate, the conductivity of tap water increased 61 percent, while the conductivity of de-ionized water increased 5566 percent. The conductivity of acetone increased over 31,000 percent, and the conductivity of acetonitrile increased over 35,000 percent. When the concentration of the ionic liquid was increased to 0.01M with acetonitrile, the conductivity increased 67,000 percent (FIG. 3).

Finally, the discoveries of the invention relating to conductivity of organic fluids containing ionic liquids, although focused primarily on wellbore operations or applications, in some instances have wider application. For example, the addition of a small amount of ionic liquid to oil or other fluid being transported in a line will allow measurement of the fluid flow.

What is claimed is:

1. A wellbore fluid of increased electrical conductivity comprising a non-aqueous base liquid selected from the group consisting of oil, refined fractions from oil, n-paraffins, alpha-olefins, internal olefins, poly-alpha-olefins, dialkyl ethers, natural oils, and mixtures thereof, containing an effective concentration of cations and anions from a water stable hydrophobic ionic liquid, and wherein said anions are selected from the group consisting of $BF_4^-$; $PF_6^-$; $SbF_6^-$; $CF_3SO_3^-$; $CuCl_2^-$; $Cu_2Cl_3^-$; $Cu_3Cl_4^-$; $NO_3^-$; $(CF_3SO_2)_2N^-$; $Br^-$; $ClO_4^-$; $CH_3COO^-$; and $BPh_4^-$.

2. The wellbore fluid of claim 1 in which an ionic liquid of the fluid comprises nitrogen-containing cations.

3. The wellbore fluid of claim 2 in which an ionic liquid of the fluid comprises heterocyclic nitrogen-containing cations.

4. The wellbore fluid of claim 1 in which an ionic liquid of the fluid comprises amine cations.

5. The wellbore fluid of claim 4 in which an ionic liquid of the fluid comprises secondary amine cations.

6. The wellbore fluid of claim 1 in which an ionic liquid of the fluid is comprised of cations having the formula

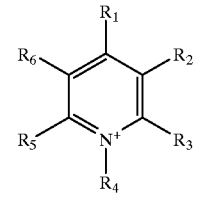

in which $R_1$, $R_2$, $R_3$, $R_4$, $R_5$, and $R_6$ are selected from H, F, and saturated and unsaturated hydrocarbon containing from 1 to 22 carbons, respectively, with the provision that the total number of carbon atoms contained by $R_1$, $R_2$, $R_3$, $R_4$, $R_5$, and $R_6$ does not exceed 24.

7. The wellbore fluid of claim 1 in which an ionic liquid of the fluid is comprised of cations having the formula

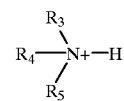

in which in which $R_3$, $R_4$, and $R_5$ are selected from H, and saturated and unsaturated hydrocarbon containing from 1 to 22 carbons, respectively, provided that $R_3$, $R_4$, and $R_5$ are not simultaneously H, and further provided that the total number of carbon atoms contained by $R_3$, $R_4$, and $R_5$, does not exceed 24.

8. The wellbore fluid of claim 1 in which an ionic liquid of the fluid is comprised of cations having the formula

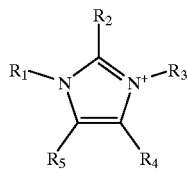

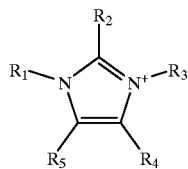

in which $R_1$, $R_2$, $R_3$, $R_4$, and $R_5$ are selected from H, F, and saturated and unsaturated hydrocarbon containing from 1 to 22 carbons, respectively, with the provision that the total number of carbon atoms contained by $R_1$, $R_2$, $R_3$, $R_4$, and $R_5$ does not exceed 24.

9. A non-aqueous base wellbore fluid of increased conductivity comprising a fluid formed by blending a non-aqueous base liquid selected from the group consisting of oil, refined fractions from oil, n-paraffins, alpha-olefins, internal olefins, poly-alpha-olefins, dialkyl ethers, natural oils, and mixtures thereof, with an effective amount of a water stable hydrophobic ionic liquid, wherein the anions of said ionic liquid are selected from the group consisting of $BF_4^-$; $PF_6^-$; $SbF_6^-$; $CF_3SO_3^-$; $CuCl_2^-$; $Cu_2Cl_3^-$; $Cu_3Cl_4^-$; $NO_3^-$; $(CF_3SO_2)_2N^-$; $Br^-$; $ClO_4^-$; $CH_3COO^-$; and $BPh_4^-$.

10. The wellbore fluid of claim 9 in which an ionic liquid of the fluid comprises nitrogen-containing cations.

11. The wellbore fluid of claim 10 in which an ionic liquid of the fluid comprises heterocyclic nitrogen-containing cations.

12. The wellbore fluid of claim 9 in which an ionic liquid of the fluid comprises amine cations.

13. The wellbore fluid of claim 12 in which an ionic liquid of the fluid comprises secondary amine cations.

14. The wellbore fluid of claim 9 in which an ionic liquid of the fluid is comprised of cations having the formula

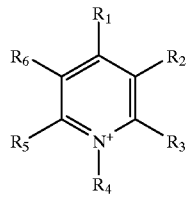

in which $R_1$, $R_2$, $R_3$, $R_4$, $R_5$, and $R_6$ are selected from H, F, and saturated and unsaturated hydrocarbon containing from 1 to 22 carbons, respectively, with the provision that the total number of carbon atoms contained by $R_1$, $R_2$, $R_3$, $R_4$, $R_5$, and $R_6$ does not exceed 24.

15. The wellbore fluid of claim 9 in which an ionic liquid of the fluid is comprised of cations having the formula

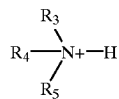

in which $R_3$, $R_4$, and $R_5$ are selected from H, and saturated and unsaturated hydrocarbon containing from 1 to 22 carbons, respectively, provided that $R_3$, $R_4$, and $R_5$ are not simultaneously H, and further provided that the total number of carbon atoms contained by $R_3$, $R_4$, and $R_5$, does not exceed 24.

16. The wellbore fluid of claim 9 in which an ionic liquid of the fluid is comprised of cations having the formula in which $R_1$, $R_2$, $R_3$, $R_4$, and $R_5$ are selected from H, F, and saturated and unsaturated hydrocarbon containing from 1 to 22 carbons, respectively, with the provision that the total number of carbon atoms contained by $R_1$, $R_2$, $R_3$, $R_4$, and $R_5$ does not exceed 24.

17. A non-aqueous base wellbore fluid of increased electrical conductivity, as set forth in any of claims 1 through 5, in which the fluid comprises a high resistivity organic liquid containing an effective concentration of cations and anions from a water stable hydrophobic ionic liquid.

18. A non-aqueous base wellbore fluid of increased conductivity comprising a single phase mixture of a non-aqueous base liquid and a minor amount of a second, different organic solvent liquid, or mixture thereof, soluble in the non-aqueous base liquid, containing an effective concentration of cations and anions from a water stable hydrophobic ionic liquid.

19. The wellbore fluid of claim 18 in which the non-aqueous base liquid is a first high resistivity organic liquid, and the second, different organic solvent liquid, or mixture thereof, comprises a second, different high resistivity organic liquid, or polar organic liquid, or mixture thereof.

20. The wellbore fluid of claim 19 in which an ionic liquid of the fluid comprises nitrogen-containing cations, and anions of a Lewis acid or of a non-Lewis acid.

21. The wellbore fluid of claim 20 in which an ionic liquid of the fluid comprises heterocyclic nitrogen-containing cations, and anions of a Lewis acid.

22. The wellbore fluid of claim 19 in which an ionic liquid of the fluid comprises amine cations, and anions of a Lewis acid.

23. The wellbore fluid of claim 22 in which an ionic liquid of the fluid comprises secondary amine cations, and anions of a Lewis acid.

24. In a method of drilling a well in which a drill bit is rotated in a wellbore while circulating a drilling fluid in the wellbore as the wellbore is formed, the improvement comprising using as the drilling fluid a non-aqueous base drilling fluid of increased conductivity containing an effective concentration of cations and anions from a water stable hydrophobic ionic liquid.

25. The method of claim 24 in which the well is electrically logged while drilling the well.

26. In a method of completion of a well in which a completion fluid is employed in the wellbore during completion of the well, the improvement comprising using as the completion fluid a completion fluid of increased electrical conductivity comprising a non-aqueous base liquid selected from the group consisting of oil, refined fractions from oil, n-paraffins, alpha-olefins, internal olefins, poly-alpha-olefins, dialkyl ethers, natural oils, and mixtures thereof, containing an effective concentration of cations and anions from a water stable hydrophobic ionic liquid, and wherein said anions are selected from the group consisting of $BF_4^-$; $PF_6^-$; $SbF_6^-$; $CF_3SO_3^-$; $CuCl_2^-$; $Cu_2Cl_3^-$; $Cu_3Cl_4^-$; $NO_3^-$; $(CCF_3SO_2)_2N^-$; $Br^-$; $ClO_4^-$; $CH_3COO^-$; and $BPh_4^-$.

27. The method of claim 26 in which the well is electrically logged during completion.

28. In a method of workover of a well in which a workover fluid is employed in the wellbore during workover of the well, the improvement comprising using as the workover fluid a workover fluid of increased electrical conductivity comprising a non-aqueous base liquid selected from the group consisting of oil, refined fractions from oil, n-paraffins, alpha-olefins, internal olefins, poly-alpha-olefins, dialkyl ethers, natural oils, and mixtures thereof, containing an effective concentration of cations and anions from a water stable hydrophobic ionic liquid, and wherein said anions are selected from the group consisting of $BF_4^-$; $PF_6^-$; $SbF_6^-$; $CF_3SO_3^-$; $CuCl_2^-$; $Cu_2Cl_3^-$; $Cu_3Cl_4^-$; $NO_3^-$; $(CCF_3SO_2)_2N^-$; $Br^-$; $ClO_4^-$; $CH_3COO^-$; and $BPh_4^-$.

29. The method of claim 28 in which the well is electrically logged during workover.

30. A method of drilling a well comprising drilling a well in a subterranean formation while circulating a drilling fluid in the wellbore as the well is drilled, the drilling fluid comprising a non-aqueous base drilling fluid of increased conductivity containing an effective concentration of cations and anions from a water stable hydrophobic ionic liquid.

31. A method comprising conducting completion activity in a well in a subterranean formation while providing a completion fluid in the wellbore, the completion fluid comprising a completion fluid of increased electrical conductivity comprising a non-aqueous base liquid selected from the group consisting of oil, refined fractions from oil, n-paraffins, alpha-olefins, internal olefins, poly-alpha-olefins, dialkyl ethers, natural oils, and mixtures thereof, containing an effective concentration of cations and anions from a water stable hydrophobic ionic liquid, and wherein said anions are selected from the group consisting of $BF_4^-$; $PF_6^-$; $SbF_6^-$; $CF_3SO_3^-$; $CuCl_2^-$; $Cu_2Cl_3^-$; $Cu_3Cl_4^-$; $NO_3^-$; $(CCF_3SO_2)_2N^-$; $Br^-$; $ClO_4^-$; $CH_3COO^-$; and $BPh_4^-$.

32. A method for workover of a well comprising conducting the workover of a well in a subterranean formation while providing a workover fluid in the wellbore, the workover fluid comprising a workover fluid of increased electrical conductivity comprising a non-aqueous base liquid selected from the group consisting of oil, refined fractions from oil, n-paraffins, alpha-olefins, internal olefins, poly-alpha-olefins, dialkyl ethers, natural oils, and mixtures thereof, containing an effective concentration of cations and anions from a water stable hydrophobic ionic liquid, and wherein said anions are selected from the group consisting of $BF_4^-$; $PF_6^-$; $SbF_6^-$; $CF_3SO_3^-$; $CuCl_2^-$; $Cu_2Cl_3^-$; $Cu_3Cl_4^-$; $NO_3^-$; $(CF_3SO_2)_2N^-$; $Br^-$; $ClO_4^-$; $CH_3COO^-$; and $BPh_4^-$.

33. In the development of a source of oil or gas in a subterranean formation by wellbore operations using a wellbore fluid, the improvement comprising providing in the wellbore as the wellbore fluid a wellbore fluid of increased electrical conductivity comprising a non-aqueous base liquid selected from the group consisting of oil, refined fractions from oil, n-paraffins, alpha-olefins, internal olefins, poly-alpha-olefins, dialkyl ethers, natural oils, and mixtures thereof, containing an effective concentration of cations and anions from a water stable hydrophobic ionic liquid, and wherein said anions are selected from the group consisting of $BF_4^-$; $PF_6^-$; $SbF_6^-$; $CF_3SO_3^-$; $CuCl_2^-$; $Cu_2Cl_3^-$; $Cu_3Cl_4^-$; $NO_3^-$; $(CCF_3SO_2)_2N^-$; $Br^-$; $ClO_4^-$; $CH_3COO^-$; and $BPh_4^-$.

* * * * *